UNITED STATES PATENT OFFICE 2,276,030

TREATMENT OF SUBSTANTIALLY SOLID RESINOUS LINEAR CONDENSATION POLYMERS

Archie L. Dubeau, Lewiston, James Douglas MacMahon, Niagara Falls, and George P. Vincent, New York, N. Y., assignors to The Mathieson Alkali Works, Inc., New York, N. Y., a corporation of Virginia No Drawing. Application June 23, 1939, Serial No. 280,817

5 Claims. (Cl. 260—78)

This invention is concerned with the treatment of substantially solid resinous bodies to improve their appearance and increase their amenability to dyeing. In particular the invention contemplates the treatment of solid resinous bodies which are synthetic linear condensation polymers capable of being drawn into pliable, strong fibres showing by characteristic X-ray patterns, orientation along the fibre axis, such, for example, as thermoplastic polyamides obtained by heating in substantially equimolecular proportions a diamine and a dibasic acid or an amide forming derivative of such an acid under conditions of condensation and polymerization until a product of high molecular weight with film or fibre forming qualities is obtained. Such bodies are known generally as "Nylon," and they and methods for their manufacture are described in United States Patents Nos. 2,071,250, 2,071,251, 2,130,947 and 2,130,948. The bodies may take the form of fabrics, filaments, bristles, sheets, ribbons, rods, tubes, etc.

The thermoplastic resinous bodies considered herein have a variety of formulae and may be made from a variety of diamines and dibasic acids or derivatives thereof, as well as from other substances as described in the aforementioned patents. By selecting the proper combination of diamine and dibasic acid, resins having different melting points and other characteristics may be formed. Thus, from hexamethylenediamine and diphenic acid a solid resinous body having a melting point of 157° C. is obtained, whereas the product of reaction of tetramethylenediamine and adipic acid has a melting point of 278° C. From the commercial standpoint the products obtained from a diamine and adipic or sebacic acid probably are most important at the present time.

Resinous products of the "Nylon" type have many valuable properties and bid fair to assume an important and industrial role, particularly in the textile trade, where their high tensile strength in filament form and their resistance to permanent distortion even when wet are important advantages. However, certain disadvantages attach to these products, not the least of which is that they tend to be produced in a discolored or "off-white" state. Despite the conduct of condensation and polymerization in glass or noble metal equipment to avoid contamination in so far as possible and despite the preparation of the polymer and its subsequent treatment substantially in the absence of oxygen (as, for example, under a blanket of inert gas such as nitrogen, carbon dioxide or hydrogen) in order to obtain a light colored product, some discoloration results, and the product frequently has a distinct yellow tinge which renders it objectionable for some purposes. Moreover, polyamide and other resinous bodies of the "Nylon" type are not amenable to dyeing to an adequate extent. Most dyes tend to penetrate them unevenly and not deeply, with the result that the dyed bodies have a "streaked" appearance, especially if they be in fabric form.

As a result of our investigations, we have discovered that discoloration of resinous solids of the "Nylon" type may be removed by treating them with an aqueous alkaline solution containing hypochlorite ions. Such treatment results, moreover, in an improved amenability of the product to dyeing, in that dyes tend to penetrate the treated product more uniformly and give a "brighter" and more uniform finish (and this is true even when the treatment is such that bleaching is not complete). Furthermore, bleaching of the product and the increased amenability to dyeing may be obtained by hypochlorite treatment without deleteriously affecting the strength of the product to a substantial degree. Thus our invention contemplates in the processing of a substantially solid thermoplastic resinous body composed of a synthetic linear condensation polymer capable of being drawn into relatively pliable strong fibres showing by characteristic X-ray patterns orientation along the fibrous axis, the polymer being selected from the group consisting of polyamides, polyesters and polyanhydrides derived from carboxylic acids, the improvement which comprises exposing the body to the action of an alkaline aqueous solution containing substantial proportions of hypochlorite ions.

In our copending application, Serial No. 280,816, filed June 23, 1939, we have described and claimed a process in which solutions containing chlorite ions, especially solutions of alkali metal chlorites, are employed to bleach and improve the amenability of resinous products of the "Nylon" type, and in this connection have disclosed that basic solutions of such chlorites may be employed if they are activated by the presence of hypochlorite ions. However, hypochlorite ions may be employed advantageously in solutions containing no chlorite ions, provided that the solutions are alkaline. Thus, hypochlorite ions may be employed in aqueous alkaline solutions, preferably having a pH in the neighborhood of 9.5. Such hypochlorite solutions do not bleach the product as readily as do acid solutions of chlorite (as described and claimed in the aforementioned copending application) but are effective in improving the amenability of resinous products of the "Nylon" type to dyeing even when the treatment does not result in substantial bleaching.

The concentration of hypochlorite to employ in solution is dependent, to some degree at least, upon the desired treatment time and the degree of discoloration of the product to be treated, but generally speaking such concentrations should be maintained at low values, i. e., not in excess of the equivalent of 5 gms. of available chlorine per liter, and preferably in the range of 0.5 to 2 gms. per liter. With such concentrations of hypochlorite in alkaline solutions, a product that is somewhat bleached and entirely suitable for dyeing is obtained in a period of 30 minutes to 2 hours at temperatures ranging at from 25° C. to 80° C. Relatively hot solutions bring about improvement in the product more rapidly.

The solution containing hypochlorite ions may be prepared in a variety of ways but is obtained advantageously by dissolving alkali metal hypochlorites directly in the solution or by adding calcium hypochlorite to the solution and thereafter precipitating the calcium by addition of alkali metal carbonate or other alkali metal salt, such as a sulphate, which has an equivalent insoluble calcium salt.

Our invention will be more thoroughly understood in the light of the following description of presently preferred practices thereof.

Series I

A series of tests were run in which approximately 10 gms. of "Nylon" sewing thread identified as "Neophil K25" and composed of a product resulting from the condensation and polymerization of a diamine and a dibasic acid, such as adipic acid, was treated in each instance in 100 cc. of solution having a pH of 9.5 but with various concentrations of sodium hypochlorite. The tests were run at room temperature for a period of ½ hour. The results obtained are shown in the following table:

| Gms. per liter available chlorine as sodium hypochlorite | Time | pH | Temperature | Relative whiteness | Tensile strength |
|---|---|---|---|---|---|
| | Hours | | ° C. | | Ounces |
| 0.25 | .5 | 9.5 | Room | 3 | 32.8 |
| 0.50 | .5 | 9.5 | Room | 2 | 33.8 |
| 1.0 | .5 | 9.5 | Room | 1 | 32.4 |

The tensile strength tests were made upon the threads after the above-described treatments followed by thorough washing of the threads in likewarm water and by drying. The tensile strength of the treated thread was determined by placing a single thread, after it had been maintained for at least 4 hours at constant temperature and humidity, in a Schopper tensile strength testing machine. The figures reported in the foregoing tabulation are in every instance the average of five tests.

The tensile strength of the original untreated threads was about 36.6 ozs. (average of 2 tests in the Schopper tensile strength testing machine). It will be observed that the decrease in tensile strength due to the treatment in alkaline hypochlorite solution was not substantial.

Series II

Dyeing tests were conducted upon the samples treated as described hereinbefore for the first series of tests. The dye employed comprised an aqueous solution containing Pontacyl blue, 5R conc. 1½% by weight, Glauber's salts 20% by weight, and glacial acetic acid 5% by weight.

The test threads were introduced into the solution when it had a temperature of 140° F. and the solution temperature was then raised quickly to the boiling point where it was held for 30 minutes. At the end of this time, the samples were removed, washed in warm water and then dried.

At the same time, untreated samples of the thread were also dyed in like manner for comparative purposes.

The original untreated material was dyed less uniformly than any of the treated samples and lacked brightness.

Good results from the standpoint of dye "evenness" were obtained with a sample X from the series which had been treated in a basic solution having a pH of 9.5 and containing 1 gm. per liter available chlorine as sodium hypochlorite. The treatment temperature was about 25° C. and the duration of the treatment was about one-half hour.

As described and claimed in our copending application Serial No. 280,816, filed June 23, 1939, it is desirable to follow the treatment in an alkaline solution of hypochlorite with treatment in an acid solution of sodium chlorite or the like.

Although the practice of the invention has been described with particular reference to threads of a condensation and polymerization product of a diamine and a dibasic acid, such as adipic acid, it will be understood that it is applicable generally to the treatment of solid resinous bodies composed of a synthetic linear condensation polymer capable of being drawn into pliable, strong fibres showing by characteristic X-ray patterns orientation along the fibre axis, whether the polymer is drawn to develop such orientation in fibre form or is formed into larger solid bodies such as bristles, rods, sheets, tubes and other forms in which plastics are fabricated. Thus, the invention may be employed to bring about the bleaching of or to increase the amenability to dyeing of a variety of solid resinous bodies including those resulting from the condensation and polymerization of hexadecamethylene dicarboxylic acid and trimethylene glycol, polyesters derived from dibasic acids plus diamines, polyanhydrides derived from dibasic acids such as adipic acid and pimelic acid, polyamides derived from amino acids such as 5-aminocaproic acid, etc.

We claim:

1. In the processing of a substantially solid thermoplastic resinous body composed of a synthetic linear condensation polymer capable of being drawn into relatively pliable strong fibres showing by characteristic X-ray patterns orientation along the fibre axis, said polymer being selected from the group consisting of polyamides, polyesters and polyanhydrides derived from carboxylic acids, the improvement which comprises increasing the amenability of the body to dyeing by subjecting it to the action of an alkaline aqueous solution containing substantial proportions of hypochlorite ions.

2. In the processing of a substantially solid thermoplastic resinous body composed of a synthetic linear condensation polymer capable of being drawn into relatively pliable strong fibres showing by characteristic X-ray patterns orientation along the fibre axis, said polymer being selected from the group consisting of polyamides, polyesters and polyanhydrides derived from carboxylic acids, the improvement which comprises bleaching the body and increasing its amenability to dyeing by subjecting it to the action of an alkaline aqueous solution containing substantial proportions of hypochlorite ions until the body is bleached substantially.

3. In the processing of a substantially solid thermoplastic resinous body composed of a synthetic linear condensation polymer capable of being drawn into relatively pliable strong fibres showing by characteristic X-ray patterns orientation along the fibre axis, said polymer being selected from the group consisting of polyamides, polyesters and polyanhydrides derived from carboxylic acids, the improvement which comprises exposing the body to an action of an alkaline aqueous solution containing substantial proportions of an alkali metal hypochlorite.

4. In the processing of a substantially solid thermoplastic resinous body composed of a synthetic linear condensation polymer capable of being drawn into relatively pliable strong fibres showing by characteristic X-ray patterns orientation along the fibre axis, said polymer being selected from the group consisting of polyamides, polyesters and polyanhydrides derived from carboxylic acids, the improvement which comprises exposing the body to the action of an alkaline aqueous solution containing available chlorine in proportions ranging from about 0.5 gm. per liter to about 5 gms. per liter in the form of hypochlorite ions.

5. In the processing of a substantially solid thermoplastic resinous body composed of a synthetic linear condensation polymer capable o.' being drawn into relatively pliable strong fibres showing by characteristic X-ray patterns orientation along the fibre axis, said polymer being selected from the group consisting of polyamides, polyesters and polyanhydrides derived from carboxylic acids, the improvement which comprises exposing the body to the action of an aqueous solution having a pH of about 9.5 and containing available chlorine in proportions ranging from about 0.5 gm. per liter to about 2.0 gms. per liter in the form of alkali metal hypochlorite.

ARCHIE L. DUBEAU.
JAMES DOUGLAS MacMAHON.
GEORGE P. VINCENT.